United States Patent [19] [11] 3,878,527

Rensin et al. [45] Apr. 15, 1975

[54] RADIANT ENERGY RECEIVER CIRCUITS

[75] Inventors: Ernest Isaac Rensin, Northridge; Tom Schnerk, Granada Hills, both of Calif.

[73] Assignee: International Telephone and Telegraph Corporation, New York, N.Y.

[22] Filed: Oct. 7, 1970

[21] Appl. No.: 78,790

[52] U.S. Cl. .................. 343/7.7; 325/421; 331/1 A
[51] Int. Cl. .................. G01s 9/42
[58] Field of Search ....... 343/7.7; 331/1 A; 325/421

[56] References Cited

UNITED STATES PATENTS

| | | | |
|---|---|---|---|
| 3,386,095 | 5/1968 | Stevens | 343/7.7 X |
| 3,461,388 | 8/1969 | Daley | 325/421 |
| 3,611,175 | 10/1971 | Boelke | 331/1 A X |
| 3,614,785 | 10/1971 | Kratzer | 343/7.7 |

*Primary Examiner*—T. H. Tubbesing
*Attorney, Agent, or Firm*—William T. O'Neil

[57] ABSTRACT

A pseudonoise receiver having both a search and a track mode performed in that sequence after the incoming signal has been acquired, wherein the search mode is rendered effective by a slight mismatch in phase or frequency of the receiver internal code, and the code on the incoming carrier. In accordance with the foregoing, positive signal acquisition is made possible within a very short time.

13 Claims, 5 Drawing Figures

PATENTED APR 1 5 1975 3,878,527

SHEET 1 OF 3

INVENTORS
ERNEST I. RENSIN
TOM SCHNERK
BY
ATTORNEY.

INVENTORS.
ERNEST I. RENSIN
TOM SCHNERK
BY
ATTORNEY

INVENTORS.
ERNEST I. RENSIN
TOM SCHNERK
BY
ATTORNEY

RADIANT ENERGY RECEIVER CIRCUITS

BACKGROUND OF THE INVENTION

This invention relates to radiant energy receivers and, more particularly, to comunications, radar and other radiant energy transmission systems in which the tracking of an incoming isgnal is required.

The systems and circuits of the present invention will have utility in a great many applications other than those disclosed herein. The invention is, therefore, not to be limited to any one or more or all of the applications so disclosed. However, the invention has been found to possess exceptional utility when employed to align an internal receiver pulse code with that of an incoming signal to, in effect, decode the incoming signal. In other words, the invention has substantial utility in connection with aligning such codes in a pseudonoise communication, radar or other system.

Pseudonoise coding of a carrier signal of substantially a single frequency is old and well known in the art. In a pseudonoise system, when a carrier is modulated with a binary digital pulse code, the energy of the single frequency carrier is spread over an extremely large band of frequencies. Thus, in order to recover enough carrier energy at the receiver to be useful, it is desirable to collapse the broad band of frequencies into a single frequency of the carrier or into some other intermediate frequency (IF).

It is known that if a pulse code can be generated internally in the receiver of the same frequency as that of the code which is employed to modulate the carrier at the transmitter, and if the internal code in the receiver is of the correct phase or time alignment with the code on the incoming carrier, the said broad banded energy can be collapsed into a signal of substantially a single frequency.

In the prior art, a method for searching for the code of the incoming carrier was to drop one bit of the internal code at regular intervals. This caused an increase in the frequency of the internal code. The increase in the frequency of the internal code also caused a regular but abrupt phase shift between the code of the incoming carrier and the internal code. The phase shift was desired and valuable because the internal code could then search for the frequency and phase of the code on the incoming carrier. However, this prior art method of producing a code phase shift or increased frequency made it impossible to pass through the synchronous phase at a relatively low velocity. This, in turn, meant that it was, except on a very few random occurrences, impossible to acquire the incoming carrier and code for tracking purposes without losing a substantial portion of the carrier signal strength. In other words, the abrupt shift of the internal code due to the dropping of an entire bit from the code almost invariably would pass the synchronous phase at which the carrier would have a peak amplitude. The lack of signal strength thus has made searching and signal acquisition difficult in the prior art.

SUMMARY OF THE INVENTION

In accordance with the systems and circuits of the present invention, the above-described and other disadvantages of the prior art are overcome by providing means for gradually varying the internal code in phase and in frequency for search.

It is also a feature of the invention that circuits for both searching and tracking are provided.

A further feature of the invention resides in the use of a searching and tracking receiver which may be employed to produce a Doppler correction in the internal code for use in, for example, a continuous wave (CW) radar system in which the received signal is due to a wave reflected from a moving target. The transmitted carrier is thus subjected to a Doppler shift. The same is true of the code on the transmitted carrier, as will be explained.

A further feature of the invention is a method of changing the pulse repetition frequency (PRF) of the output of a clock.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

BRIEF DESCRIPTION OF THE PREFERRED EMBODIMENTS

Figure 1:
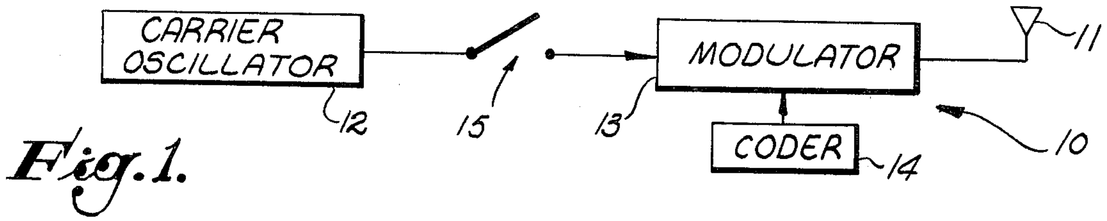
FIG. 1 is a block diagram of a pseudonoise transmission system constructed in accordance with the present invention.

In FIG. 1, a pseudonoise transmitter indicated at 10 is connected to a transmitting antenna 11. Transmitter 10 includes a carrier oscillator 12, a modulator 13 and a coder 14. The output of oscillator 12 can be supplied to modulator 13 via a switch 15 connected therebetween. The output of modulator 13 is connected to antenna 11. The ouput of coder 14 is connected to modulator 13.

In conventional pseudonoise transmitter, switch 15 may not be provided. Except for switch 15, transmitter 10 may be entirely conventional. The same is true of all of the structure illustrated in FIG. 1 except switch 15.

The first complete pseudonoise system to be described herein is a communications sytem. The manner in which the intelligence is transmitted may be, for all practical purposes, wholly immaterial to the present invention. Switch 15 may be a telegraph key. However, many different kinds of transmitters may be employed with a receiver of the present invention, and such transmitters may be entirely conventional or new.

As stated previously, transmitter 10 may be conventional. Thus, the output signal of oscillator 12 may be relatively pure in frequency. That is, the ouutput signal of oscillator 12 may be considered a single frequency carrier signal for practical purposes. Coder 12 is likewise entirely conventional and may produce, for example, a binary digital pulse code by any one or more of the structures which are prior art hereto. For example, several pseudonoise code generators or codres are described in Chapter 4 of the book, *Modern Radar*, edited by Raymond Burkowitz (John Wiley & Sons, Inc., New York, 1965).

Coder 15 may produce an output, for example, which is either high or low at different times. For example, one pulse may be followed by three equal pulse periods of a low amplitude. Two pulses than may be generated separated by a period of low output, all pulses being equal in time, width and amplitude. The foregoing is a description of a typical portion of a coded word. A word may, for example, have 32 bits. The code of each word is identical.

Modulator 13 is entirely conventional, and may be of the type which reverses the phase of the signal from oscillator 12 when modulator 13 receives an output pulse from coder 14. Alternatively, modulator 13 may be a simple amplitude modulator.

It might be of interest to point out the general utility of a pseudonoise system. It is that the energy of a carrier is coded in such a complicated way that, if the receiver knows the complicated way in which the carrier is coded, a strong signal may be picked out of a haystack of high amplitude noise. Moreover, such systems are not easily susceptible to jamming.

Figure 2:
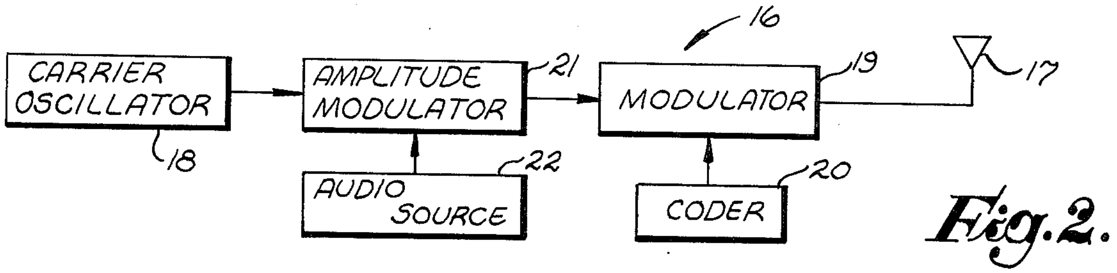
FIG. 2 is an alternative block diagram of a pseudonoise transmission system constructed in accordance with the invention.

An alternative transmitter constructed in accordance with the present invention is indicated at 16 in FIG. 2 connected to a transmitting antenna 17. Transmitter 16 has an oscillator 18, a mdoulator 19 and a coder 20 which may be indentical to oscillator 12, modulator 13 and coder 14, respectively, shown in FIG. 1. An amplitude modulator 21 is connected from oscillator 18 to modulator 19. An audio source 22 is connected to amplitude modulator 21. Audio source 22 and amplitude modulator 21 simply place an amplitude modulation on the output of oscillator 18 before it is further modulated in modulator 19. Source 22 may be an entirely conventional source of signals derived from a microphone.

THE EMBODIMENT SHOWN IN FIG. 3

Figure 3:
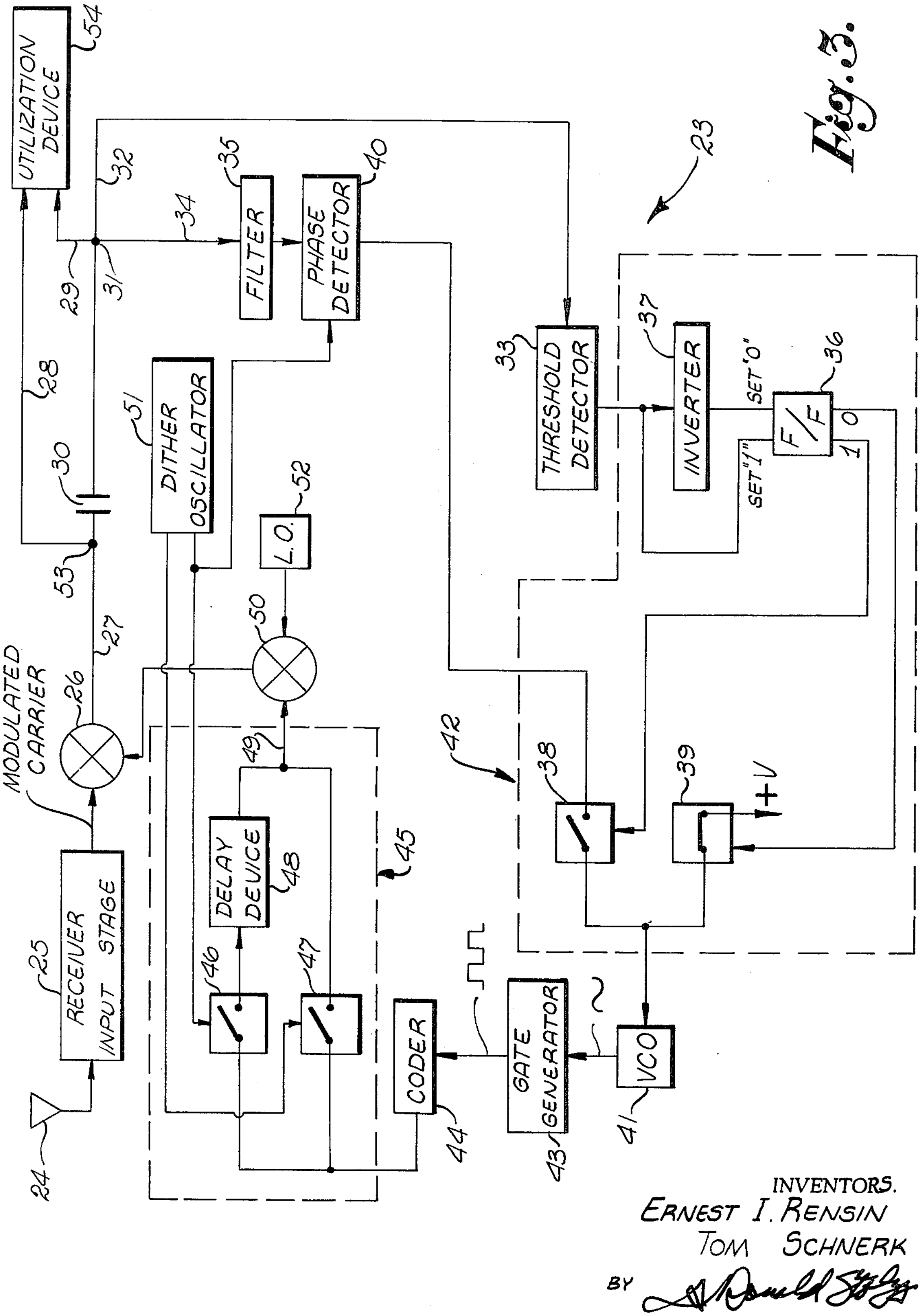
FIG. 3 is a block diagram of a pseudonoise receiving system constructed in accordance with the invention.

In FIG. 3, a receiver 23 is connected from a receiving antenna 24. If desired, the transmitter 10 and antenna 11, as shown in FIG. 1, may be employed with receiver 23 and antenna 24. Although it is not necessary, both transmitter 10 and receiver 23 may be located in a fixed position on the ground. In this case, the system of the present invention may be simply a communications system, an switch 15 may be a telegraph key. A receiver input stage 25, which may or may not be used, as desired, is connected from antenna 24 to a balanced mixer 26. Mixer 26 provides an output signal on a lead 27 which may be the intelligence transmitted. The ouput of mixer 26 may be taken by a utilization device 54 on a lead 28 or on a lead 29. This will depend upon what kind of intelligence it is, and how the carrier is modulated. For example, the system shown in FIG. 2 may be employed in lieu of that shown in FIG. 1.

A DC blocking capacitor 30 is connnected from lead 27 to a junction 31. A lead 32 is connected from junction 32 to a threshold detector 33. A lead 34 is connected from junction 31 to a filter 35. The output of threshold detector 33 is impressed upon the set "1" input of a flip-flop 36. The output of detector 33 is also connected to an inverter 37. The output of inverter 37 is connected to the set "0" input of flip-flop 36.

The "1" output of flip-flop 36 is connected to a switch 38. The "0" output of flip-flop 36 is connected to a switch 39. The outputs of flip-flop 36 control whether or not switches 38 and 39 are open or are closed.

Switches 38 and 39 are electronic switches and may be of any conventional type, but will be referred to herein as switches or gates.

The output of filter 35 is connected to a phase detector 40. The input to switch 38 is provided from the output of detector 40. The input of switch 39 is simply a constant DC voltage. The ouputs of switches 38 and 39 are connected to a voltage controlled oscillator (VCO) 41.

The equipment shown in the dotted block 42 may be described as a search and track control.

All of the blocks disclosed herein and not described in further detail may be entirely conventional. Thus, VCO 41 may be conventional. VCO 41 produces an output signal of substantially a single frequency which can be changed by changing the amplitude of the DC voltage applied thereot at the output of either switch 38 or switch 39. Note that switches 38 and 39 are not closed simultaneously but alternately.

The output signal of VCO 41 is a sine wave. A gate generator 43 produces an output signal which is a square or rectangular wave of the same frequency as the output signal of VCO 41. Gate generator 43 may simply be a squarer, if desired. The word "squarer" is thus used herein to mean any device which will produce a square or rectangular wave at the same frequency of the input thereto.

The output of gate generator 43 is impressed upon a coder 44 which may be identical to either one or both of coders 14 and 20. According to the invention, it is essential that the code produced by coder 44 be the same as that produced by the coder used in the transmitter of the same system in which receiver 23 is employed.

A phase shifter 45 is connected from the output of coder 44. Phase shifter 45 includes two more electronic switches 46 and 47. A delay device 48 is connected from the output of switch 46 to a lead 49. The output of switch 47 is also connected to lead 49. The inputs of switches 46 and 47 are connected from the output of coder 44. Lead 49 is connected to one input of a balanced mixer 50. A dither oscillator 51 actuates switches 46 and 47 alternately. Dither oscillator 51 may simply be an astable multivibrator. One output of oscillator 51 provides a second input to phase detector 40. Mixer 50 receives a second input from a local oscillator 52. The output of mixer 50 is impressed upon mixer 26.

Capacitor 30 may be omitted, if desired. Leads 28 and 29 may thus be redundant if junction 53 is connected directly to junction 31.

Filter 35 may be omitted in some cases. Filter 35 is employed to separate the modulation of dither oscillator 51 on the output signal of mixer 26 from the intelligence modulation therein. If filter 35 is used, it will thus normally be, although not necessarily, a band pass filter with a small pass band and a center frequency equal to the oscillation frequency of dither oscillator 51.

OPERATION OF THE EMBODIMENT SHOWN IN FIG. 3

One of the main purposes of receiver 23 is to align in time the code modulation of the incoming carrier with the output code of phase shifter 45. When the codes are precisely aligned, the signal strength at the output of mixer 26 is at a maximum. On the other hand, if there is other than a small phase change between the codes, i.e., between the incoming code and the internal code, as provided by phase shifter 45, the amplitude of the output signal of mixer 26 falls rapidly to zero.

In order to better understand the operation of receiver 23, it is also necessary to note that the amplitude of the output signal of mixer 26 falls at substantially the same rate with respect either to positve or negative phase misalignment of the incoming and internal codes.

In the operation of the receiver 23, for example, a coded and intelligence modulated carrier received by antenna 24 may be treated in stage 25, e.g., by amplification. Local oscillator 52 may, if desired, have a fixed frequency equal to or, for example, a fixed frequency less than the frequency of the incoming carrier. The output of mixer 50 in receiving a code on lead 49 and with the input from local oscillator 52 provides an input signal to mixer 26 which in effect decodes the coded incoming carrier. The output signal of mixer 26 may thus be an IF or a modulated DC.

During search, the function of dither oscillator 51 may be ignored. Diter oscillator 51 actually jumps the internal code abruptly forward and to the rear at the dither oscillator oscillation frequency. However, this jitter is quite small in comparsion to the search of the internal code to be described.

Note that if VCO 41 is operating at a certain frequency, even if that frequency is precisely equal to the frequency of the incoming code, the incoming and internal codes are not necessarily matched up unless further precautions are taken. That is, even though the code frequencies are the same, a phase misalignment between them may exist. It is thus necessary for the internal code to search for, and find, the correct frequency and phase match for the incoming code. Note that nothing can be done to change the incoming code. That is, as received, it is an independent variable.

As will be recalled from many examples in the prior art relating to communications or the like, there is a relationship between frequency and phase. Thus, any phase error may be corrected by making a frequency correction and vice versa. In the instant case, a frequency change is made to correct a phase error. That is, the correction made by the control of the VCO 41 cause VCO 41 to produce an output signal of a correct frequency equal to the frequency of the incoming code. At the same time, the control of VCO 41 makes it possible to correct the phase of the internal code to match that of the incoming code. The latter is accomplished by creating a small frequency error temporarily. Control 42 and other blocks shown in receiver 23 control VCO 41 to produce an output signal of the proper frequency and phase to match the internal code with the received code.

Receive 23 has two modes of operation. The first mode is that of searching or acquisition. In this mode, switch 38 is open, and switch 39 is closed. Thus, VCO 41 in the search mode receives a constant DC voltage through switch 39. This DC voltage does not correspond exactly to the expected frequency of the incoming code. Note will be taken that a fixed DC voltage input to VCO 41 will provide a certain output signal of a certain frequency. Hence, if the ouput signal of VCO 41 had a frequency equal to the expected frequency of the incoming code, both codes might not move with respect to each other, or might move extremely slow so that it might be necessary to search for the incoming code for a long period of time before the incoming signal could be acquired and tracked. It is thus necessary to provide VCO 41 via switch 39 with a DC input voltage which is different from that corresponding to the expected received code frequency. The search velocity will then be directly proportional to the difference between the reciprocals of the oscillation frequency of VCO 41 and the frequency of the incoming code. Whether the input voltage to VCO 41 is above or below the voltage for the expected received code frequency will determine whether or not the rate of change of phase of the internal code with respect to that of the received code is positive or negative.

Thus, the output of VCO 41 is a substantially constant frequency during search, which frequency is different from the expected received code frequency.

Gate generator 43 merely squares up the output of VCO 41, and may simply be a squarer. Coder 44 takes the output pulses of gate generator 43 and impresses them upon phase shifter 45. Phase shifter 45 does not substantially change the input thereto at the output therefrom on lead 49 for all practical purposes during search. The internal code on lead 49 is then combined with the output of local oscillator 52 in mixer 50, as described previously. The internal code on lead 49 thus slips or advances depending upon the magnitude of the input voltage to switch 39 until finally the ouput signal of mixer 27 begins to increase substantially.

At a predetermined threshold level of the ouput of mixer 26, threshold detector 33 sets flip-flop 36 to the "1" state which transfers switches 38 and 39 from the search mode to the tracking mode. That is, switch 39 is opened, and switch 39 is closed.

Once tracking has begun, the operation of other portions of the receiver 23 become more important.

During the tracking mode, VCO 41 is now already close to or precisely in frequency and phase alignment with the frequency and phase of the received code. Dither oscillator 51, every other half cycle, delays the output code of coder 44 by routing the output of coder 44 through delay device 48. This is accomplished, as before, by switches 46 and 47. Switch 47 routes the output of coder 44 directly to one input of mixer 50. Switch 46 routes the ouput of coder 44 through delay device 48 and then to the input to mixer 50 on lead 49. Switches 46 and 47 are thus operated alternately.

The jitter of the internal code on lead 49 creates an amplitude modulation on the output of mixer 26 because the jitter amounts to a change in phase of the internal code which, as stated previously, produces a change in the output signal strength of mixer 26. Filter 35 derives the dither modulation frequency from the output signal of mixer 26. This is fed to phase detector 40 with an input from dither oscillator 51. Phase detector 40 then produce an output signal which may be either a positive or negative DC voltage. The ouput of phase detector 40 may also be at zero volts or ground potential. Phase detector 40 drives VCO 41 through switch 38 until the phase and frequency of the output signal of VCO 41 is substantially equal to those of the incoming code.

Due to the fact that the amplitude of the output signal of mixer 26 is triangular versus the relative phases of the internal and received codes, the dither oscillator will place an amplitude modulation of the ouput of mixer 26 which is twice the frequency of that of oscillator 51 when substantially perfect frequency and phase alignment of the received and internal codes exist. Phase detector 40 is entirely conventional and will thus not see any phase error with the double frequency signal. On the other hand, if the phase of the code at the output of switch 47 is not approximately half way in advance of the received code, and the output code of delay device 48 is not approximately half way behind the phase of the received code, the output signal of mixer 26 will contain a signal of a frequency equal to that of oscillator 51, which will indicate a phase error between the received and internal codes. Phase detector 40 will then produce DC voltage directly proportional to this error and correct the same by adjusting the frequency of VCO 41 through switch 38.

Inverter 37 merely resets flip-flop 36 to the search position if the signal is lost. The cycle is then repeated.

A utilization device 54 may be connected either from lead 28 or from lead 29, or both. Utilization device, transmitter 10 is employed, may simply be a buzzer, lamp or any device to indicate the opening or closing of switch 15. If transmitter 16 is employed, utilization device 54 may be any completely conventional device to reproduce an audio signal appearing in the output of mixer 26 due to the use of source 22 and modulator 21 in FIG. 2.

THE ALTERNATIVE EMBODIMENT OF FIG. 4

Figure 4:
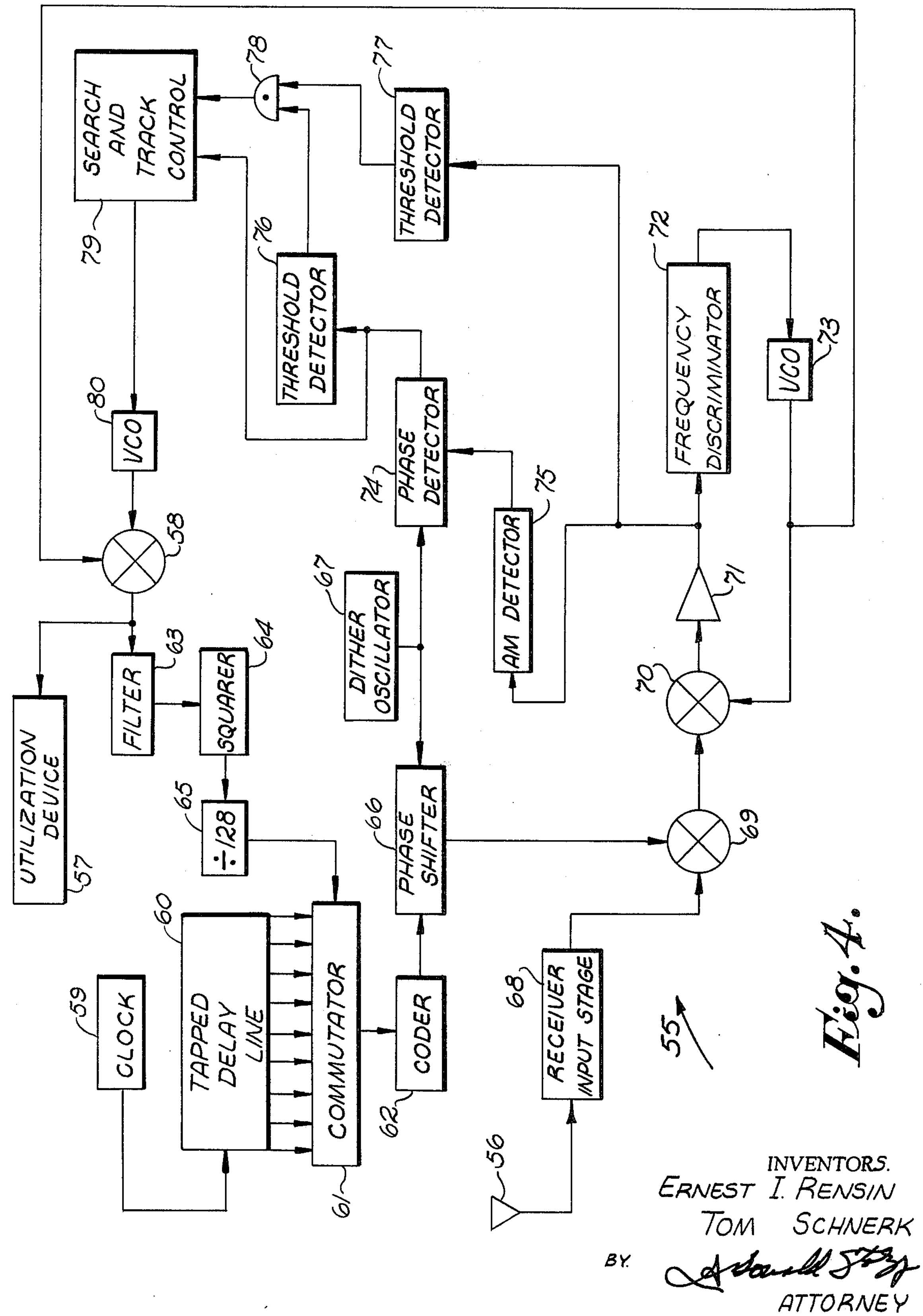
FIG. 4 is a block diagram of a receiver with an electronic commutator constructed in accordance with the invention.

In FIG. 4, a receiver 55 is illustrated connected to a receiving antenna 56. Receiver 55 may be employed as ground based or airborne equipment or otherwise in a continuous wave (CW) radar guidance system, gun laying system or othewise. Receiver 55, for example, may be employed with transmitter 10, with switch 15 closed at all times.

Receiver 55 may be useful, as all of the embodiments disclosed herein may be useful, for a great many purposes. One specific utility for receiver 55 may be to produce an indication of the velocity of an airborne vehicle. For example, transmitter 10 and receiver 55 may both be ground based. Receiver 55 has a utilization device 57 connected from the output of a mixer 58. The output of mixer 58, as will be explained, is an alternating signal whose frequency is equal to the Doppler of the airborne vehicle or target. Utilization device 57 may thus be simply a frequency meter calibrated in velocity, a frequency detector for producing an analog voltage directly proportional to velocity, or otherwise. If the velocity analog is provided, this output may be used in a vehicle guidance or in a gun laying system, both of which may be entirely conventional. Further, utilization device 57 may be an entirely conventional guidance system or gun laying system.

For purposes of definition, it is not uncommon to find in the literature a Doppler frequency defined as the carrier frequency of a wave reflected from a moving target. However, it is also quite common in the art to refer to a frequency which is the Doppler shift from the transmitted carrier as the "Doppler" or "Doppler frequency." For use herein, "Doppler" and "Doppler frequency" are hereby define to mean the difference between the frequency of the transmitted carrier and the frequency of the reflected carrier.

Receiver 55 includes a clock 59, which produces rectangular or square waves at a constant frequency which may be slightly above, equal to, or slightly below the expected received code. Any source of these pulses may be employed whenever available. For example, a separate clock need not be employed where the transmitted code is already avaiable in a larger system.

A tapped delay line 60 is connected from clock 59. A commutator 61 is connected from delay line 60. A coder 62 is connected from the output of commutator 61. A filter 63, a squarer 64 and a divider 65 are successively connected from the output of mixer 58 to communtator 61.

It is the purpose of commutator 61 to provide a continual series of pulses to coder 62, which series has a proper phase and frequency to match that of the received code. The construction and operation of delay line 60 and commutator 61 will be described in greater detail hereinafter.

Delay line 60 may take various forms, as may commutator 61. For the single form for each disclosed herein, clock 59 produces pulses at a frequency less than the expected received code frequency, and delay line 60 and commutator 61, as controlled by divider 65, increases the deficient frequency of clock 59 variably to produce an alignment of the internal code with te received code. However, the reverse coudl be true. That is, the frequency of clock 59 might be higher than the expected received code frequency, and delay line 60 with commutator 61 controlled by divider 65 may reduce the excessive frequency of clock 59. Commutator 61 may be an entirely conventional sampler which samples at a rate equal to the pulse repetition frequency (PRF) of the output signal of divider 65. Commutator 61, as will be described, samples the taps on delay line 60 from left to right, as viewed in FIG. 4, where it is assumed that the left delay or zero delay is encountered by sampling the lefthand tap. This increases the effective PRF of the output of commutator 61 over the PRF of the output of clock 59. By sampling in the opposite direction, the effective PRF at the output of commutator 61 will be below the PRF of the output of clock 59.

If desired, a switching device for switching from sampling in the positive direction to the negative direction may be employed. In order to do this, it would be necessary to provide a switch control. The switch control state would represent whether the phase misalignment of the codes is positive or negative. As will be described, commutator 61 employs a binary digital counter with logic. Thus, a more complicated set of logic will be required to count in two opposite directions for sampling the output of delay line 60 in one order, and the in the reverse order.

Coder 62 may be identical to all the coders illustrated herein. A phase shifter 66 is connected from coder 62 and a dither oscillator 67.

A receiver input stage 68, a mixer 69, a mixer 70 and an amplifier 71 are connected successively from receiving antenna 56. Phase shifter 66 provides a second input to mixer 69. The output of amplifier 71 is connected to an amplitude modulation (AM) detector 75, a threshold detector 77 and a frequency discriminator 72. Discriminator 72 has an output which controls the output signal frequency of a VCO 73. The output of VCO 73 is impressed as an additional input on mixer 70 and as an input to mixer 58.

A phase detector 74 receives an input from dither oscillator 67 and a second input from AM detector 75.

Threshold detectors 76 and 77 are connected, respectively, from the outputs of detector 74 and amplifier 71 to an AND gate 78. A search and track control 79 is connected from AND gate 78 and phase detector 74 to a VCO 80. The output of VCO 80 provides a second input to mixer 58.

Dither oscillator 67 may be identical to dither oscillator 51, if desired. Search and track control 79 may be identical to search and track control 42, shown in FIG. 3. For example, the input to control 42 from threshold detector 33 may be connected to the output of gate 78. The input to switch 38 from phase detector 40 may be connected to the output of phase detector 74. The input to VCO 41 provided by control 42 may be connected to the input of VCO 80.

Delay line 60 may be any conventional tapped delay line. Alternatively, one individual delay device might be connected between each adjacent pair of leads 91–98, shown in FIG. 5, in lieu of delay line 60. In the later case, each one of the delay devices would have a delay equal to that of each of the others.

THE COMMUTATOR 61 ILLUSTRATED IN FIG. 5

Commutator 61 includes an entirely conventional binary digital counter 81 which has exactly eight stable states and is always reset to zero on the ninth input pulse thereto.

Counter 81 includes a conventional logic circuit 82 connected from divider 65, and flip-flops A, B and C connected to AND gates 83, 84, 85, 86, 87, 88, 89 and 90.

Figure 5:
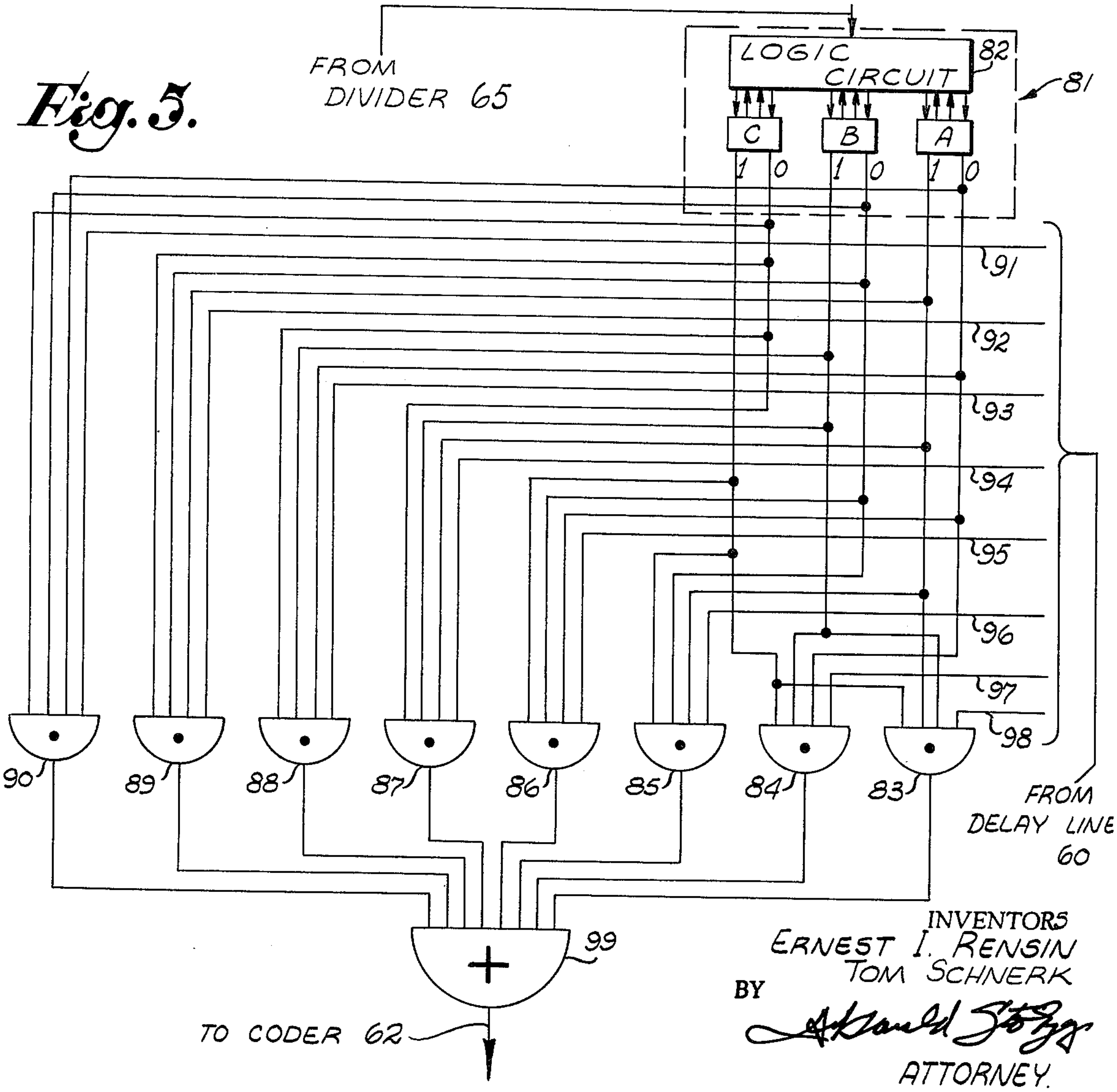
FIG. 5 is a block diagram of an alternative pseudonoise receiving system constructed in accordance with the invention.

Each of the AND gates shown in FIG. 5 receives one and only one input from delay line 60. Each of the outputs of delay line 60 is connected to one and only one AND gate shown in FIG. 5. The outputs from delay line 60 are indicated at 91, 92, 93, 94, 95, 96, 97, and 98 in FIGS. 5. Lead 91 may be considered to have no delay. Lead 92 may be considered to have a delay of *d*; 93, a delay of 2*d*; a delay of 3*d;* 95, a delay of 4*d;* 96, a delay of 5*d;* 97, a delay of 6*d;* and 98, a delay of 7*d.*

Gates 83–90 open in reverse order. That is, gate 90 opens first, 89 opens second, etc. This is accomplished by the logic circuit connected between the flip-flops and AND gates shown in FIG. 5. When AND gate 83 closes, AND gate 90 opens next.

All the outputs of the AND gates shown in FIG. 5 are connected to the input of an OR gate 99. The output of OR gate 99 is impressed upon coder 62.

OPERATION OF THE EMBODIMENT ILLUSTRATED IN FIG. 4

For purpose of illustration only, let it be assumed ath the transmitter 10 is employed with the switch 15 closed, and with receiver 55, both transmitter and receiver being ground based. Let is also be assumed that the utility of the device is to produce an output signal which is a Doppler frequency that is created by a moving target.

As stated previously, in order to obtain a maximum received signal strength, the internal and received codes must have the same phase and frequency. It goes without saying, of course the code provided bby coder 62 must be identical to the code provide by the transmitter coder.

Receiving antenna 56 impresses the received signal on stage 68 which is matched with the output of phase shifter 66 in mixer 69. Phase shifter 66 is identical to phase shifter 45. Control 79 also contains an offset search voltage for VCO 80. Through mixer 58, filter 63, squarer 64 and divider 65, commutator 61 shifts the phase and frequency of the output of clock 59 continuously forward, or to the rear. The output of mixer 69 thus stays rather low in amplitude until the received code and the internal code at the output of coder 62 match up. When the output of mixer 69 increases substantially, frequency discriminator 72 through VCO 73 servos the IF output of mixer 70 to a substantially constant IF. The substantial increase in the output of mixer 70 is detected by threshold detector 77. However, gate 78 being on AND gate does not transfer control 79 to the tracking mode until the output of threshold detector 76 is also high. AM detector 75 detects the amplitude modulation on the output of mixer 70 due to dither oscillator 67. The phase synchronization or lack of it is determined by phase detector 74, as before. When synchronization exists, threshold detector 76 with threshold detector 77 through AND gate 78 causes conrol 79 to be operated in the tracking mode.

Threshold detector 76 includes an inverter for operating control 79 to produce a high ouput signal when the phase error between the codes is sufficiently small.

During tracking, dither oscillator 67 produces the small received signal modulation which keeps the codes aligned. The operation is, therefore, analogous to the operation of dither oscillator 51 in FIG. 3. Receiver 55 has a few differences from receiver 23. One of these differences is the use of mixer 58 with other devices connected therefrom. Since VCO 73 follows faithfully the carrier frequency, the output of VCO 73 thus has a frequency which is equal to the sum of the transmitted carrier frequency and the Doppler, antenna 56 receiving the wave reflected from the airborne vehicle. Thus, if the output frequency of VCO 73 is designed to be equal to the output frequency of VCO 80 when the codes are perfectly aligned, the output of mixer 58 will be an alternating signal having a frequency equal to the Doppler of the carrier. Receiver 55 can, therefore, compensate for the Doppler shift.

There are several very important considerations to be noted in understanding the Doppler correction. In the first place, there is a Doppler of the carrier. In the second place, there is a Doppler of the code or code frequency. Moreover, the Doppler of the carrier is not equal to the Doppler of the code. More specifically, the Doppler of a signal is directly proportional to frequency. It is common to use a code frequency of, for example, 10 MHz. It is common to employ a carrier frequency of 10 GHz. Thus, it is common to use a carrier frequency which is a thousand times as large as the code frequency. Thus, the Doppler shift of the carrier will be a thousand times a great as the Doppler shift of the code. The PRF of the output of commutator 61 should thus be corrected by a frequency which is about 1/1000 of the frequency of the output signal of mixer 58. Divider 65 and commutator 61 with delay line 60 accomplishes this correction, while at the same time, operate in search and track to provide the correct PRF for the input to coder 62. The way in which the Doppler correction is made is that the divider 65, by dividing by 128, makes it possible for each 128 cycles of the derived Doppler to advance the clock in time by oneeighth of a pulse period of the clock. Thus, for each 128 cycles of Doppler, 1 cycle will be added to the clock. Note that the reason that 128 cycles of Doppler adds 1 cycle to the clock is that delay line 60 has 8 taps and 8 ×128 is 1,024. This thus makes the Doppler correction. It is true that 1,024 exceeds 1,000 by 24. However, the ratio of 1,024 to 1 of X-band Doppler, e.g., 10 GHz, to clock Doppler is sufficiently accurate to provide a close match between the internal and received bit rates after acquisition. Thus, a carrier frequency of 10 GHz might sill be employed with a code frequency of 10 MHz.

A spillover rejection system disclosed in copening application Ser. No. 81,815, filed on Oct. 19, 1970, by E. I. Rensin-R. R. Waer, for Radiant Energy Receiver Circuits, a continuation of (now abandoned) Ser. No. 670,730 filed Sept. 26, 1967, may be used with the present invention.

The entire said copending application is, therefore, incorporated herein as though fully set forth hereat by this reference hereto.

Phase detectors 40 and 74 are preferably entirely conventional. However, these circuit components are more than better known as "synchronous amplitude modulation detectors" rather than simply "phase detectors". The phrase "phase dector" as used herein and in the claims is, therefore, hereby defined as a synchronous amplitude modulation detector or an equivalent thereof.

It is to be noted that the output of, for example, mixer 26 in FIG. 3, when the internal code lags, the received is below peak. As the internal code catches up with, and becomes synchronous with, the received code, the output of mixer 26 to, for example, filter 35 reaches a peak. However, should the internal code advance ahead of the received code, the output of mixer 26 will again fall. For this reason, when the main phase and frequency of the internal code is such that a peak is generated, dither oscillator 51 produces an amplitude modulation back and forth across the peak output of mixer 26 which has a frequency equal to twice the oscillation frequency of dither oscillator 51. This is inherent in the characteristic operation wherein the output of mixer 26 falls from the peak either when the internal code lags or leads to received code. That is, the output of mixer 26 receives an amplitude modulation which has a frequency which is the second harmonic of the fundamental in the output of dither oscillator 51. For this reason, filter 35 is preferably a band pass filter which straddles the frequency of said second harmonic, but will not pass the fundamental in the output of dither oscillator 51.

What is claimed is:

1. A pseudonoise receiver comprising: first means to receive an incoming first signal, a pseudonoise coded carrier; said first means including second means to decode said first signal when a second signal is applied to said second means, said second signal comprising a series of pulses having a code and code phase the same as that of the carrier code, said second means producing a third output signal including the decoded carrier when said second signal is impressed on said second means; a variable frequency first oscillator adapted to oscillate at a frequency as a function of an input thereto; third means responsive to said third signal to provide a fourth signal of a magnitude to drive said first oscillator so that the frequency thereof continuously follows the clock frequency of the carrier code; a first switch actuable to supply a substantially constant fifth signal to the said input of said first oscillator; a second switch actuable to impress said fourth signal on said first oscillator input; fourth means to acutate said first switch and to deactuate said second switch when the magnitude of said third signal is less than a predetermined level, and to deactuate said first switch and to actuate said second switch when the magnitude of said third signal is greater than said predetermined level; and fifth means responsive to the output of said first oscillator for producing an internal serial pulse code the same as that of the carrier code and of a clock frequency which is a function of that of said first oscillator, said second means being connected from said fifth means to receive said internal code therefrom, said fifth signal being of a magnitude to cause said internal code to be generated at a clock frequency different from that of the carrier code.

2. The invention as defined in claim 1, wherein said fifth means produces said internal code with a clock frequency equal to that of said first oscillator, said second means including a first mixer being connected from the output of said first means, said second means including a second mixer having its output connected to another input of said first mixer, a local oscillator connected to one input of said second mixer, third and fourth switches connected from the output of said fifth means, a delay device connected from the output of said third switch to the other second mixer input, said fourth switch being directly connected to said other second mixer input, an astable multivibrator having first and second outputs connected to said third and fourth switches, respectively, to actuate said third and fourth switches only alternately, a filter connected from the output of said first mixer to pass the oscillation frequency of said multivibrator, a phase detector within said third means connected from said filter and one output of said multivibrator to said second switch, said fourth means including a threshold detector connected from said first mixer, said predetermined level being the threshold level of said detector, said fourth means including sixth means connected from said threshold detector to actuate said first and second switches only alternately, said fifth means including a code generator connected from the output of said first oscillator to said third and fourth switches.

3. The invention as defined in claim 1, wherein said second means includes a first mixer, a second mixer connected from the output of said first mixer, an amplifier connected from the output of said second mixer, a frequency discriminator connected from the output of said amplifier, a variable frequency second oscillator connected from the output of said discriminator, the output of said second oscillator being connected to another input of said second mixer, an amplitude modulation detector connected from the output of said amplifier, an astable multivibrator, a phase detector connected from the ouputs of said multivibrator and said amplitude modulation detector, the output of said phase detector being connected to said second switch, a threshold detector responsive to said third signal, said fourth means including sixth means to actuate said first and second switches only alternately, said predetermined level being the threshold level of said threshold detector, a third mixer having first and second inputs connected, respectively, from the outputs of said first and second oscillators, a filter connected from the output of said third mixer, a squarer connected from the output of said filter, a frequency divider connected from the output of said squarer, a clock having a frequency slightly different from the received code frequency, a tapped delay line connected from said clock, a commutator connected from the delay line taps, said commutator being connected from said divider to change the phase of said clock frequency in accordance with the frequency of the output sginal of said divider, a code generator within said fifth means connected from said commutator, and seventh means connected from said code generator and said multivibrator to said first mixer for impressing a serial pulse code on said first mixer which has a phase that oscillates about a mean at a frequency equal to the oscillation frequency of said multivibrator.

4. In a pseudonoise receiver, the combination comprising: first means responsive to an incoming carrier signal having a serial pulse code thereon and to a similar internal serial pulse code for producing an output signal in accordance with the relative phases of said codes; second means to impress said internal code on said first means with a phase oscillation about a predetermined mean; and third means responsive to a signal in the output of said first means having a frequency equal to the second harmonic of the said phase oscillation frequency to shift the frequency of said internal code in a direction tending to maintain the output signal strength of said first means at a peak, said second means including a first variable frequency oscillator, a code generator connected from the output of said first oscillator, and fourth means connected from the output of said code generator to the input of said first means to oscillate the phase of the output code of said generator.

5. The invention as defined in claim 4, wherein said first means includes a mixer a first input to receive the coded carrier, a second input to receive said internal code, and an output, said code generator producing a serial pulse code the same as that of said carrier but at a frequency equal to that of said first oscillator, a second oscillator, said fourth means being responsive to the output of said code generator and to the output of said second oscillator to impress the code of said code generator on said second mixer input with a phase modulation frequency equal to the oscillation frequency of said second oscillator, said third means having an output connected to the input of said first oscillator.

6. The invention as defined in claim 5, wherein said third means includes a phase detector, the output of said phase detector being connected to the input of said first oscillator, said phase detector having two inputs connected from the output of said mixer and the output of said second oscillator, respectively.

7. In a system utilizing a pseudonoise coded carrier wave reflected from a moving target, a receiver comprising: first means responsive to the coded reflected wave and to an internal code to produce a first signal which is the decoded carrier; second means responsive to said first signal to produce a second alternating signal of a frequency which is a function of the frequency of the Doppler of the carrier; and third means responsive to said second signal to supply said internal code to said first means with a frequency which is a function of said carrier Doppler frequency.

8. The invention as defined in claim 7, wherein said second signal is the carrier Doppler, said third means including fourth means actuable to provide a serial pulse code similar to that of the received code and of approximately the same frequency as the received code, but continuously shifted in phase in direct proportion to said carrier Doppler frequency, and fifth means to actuate said third means at a switching rate to shift said code phase, said means being adapted to control said fourth means at a PRF which is a fraction of said carrier Doppler frequency.

9. The invention as defined in claim 8, wherein said fourth means includes a delay line having a predetermined number of equally spaced taps, a commutator connected from said delay line, a coder connected from said commutator, said first means being responsive to the output of said coder, the product of said number of taps and said fraction being approximately equal to the ratio of the code frequency to the carrier frequency.

10. The invention as defined in claim 7, wherein said first means includes a first mixer, said second means including a second mixer having one input connected from the output of said first mixer, an amplifier, a frequency discriminator and a first variable frequency oscillator connected in succession from the output of said second mixer to another input thereto, a second oscillator, a third mixer having first and second inputs connected from said first and second oscillators, respectively, said third mixer having an alternating output signal of a frequency equal to the Doppler of the carrier.

11. The invention as defined in claim 10, including means responsive to the ouput of said amplifier to vary the frequency of said second oscillator.

12. The invention as defined in claim 7, wherein said third means is actuable to produce a variation in the internal code frequency in direct proportion to the product of the carrier Doppler frequency and the ratio of the code frequency to the carrier frequency.

13. In a pseudonoise receiver, apparatus for searching for the incoming signal including a pulse coded carrier comprising:

first means responsive to said coded carrier and to an internal serial pulse code for producing an output signal;

second means for impressing said internal code on said first means with an approximately constant clock frequency differing slightly from the frequency of said carrier code to shift the phase of said internal code gradually until said internal code and said carrier code are substantially aligned;

third means actuable to track said carrier code;

fourth means connected to receive said output signal from said first means, said fourth means being adapted to actuate said third means when said output signal exceeds a predetermined level;

and fifth means actuable to produce ocillation of the phase of said internal code about a mean phase value substantially equal to the phase at which said first means ouput signal exceeds said predetermined level.

* * * * *